W. M. HEALEY.
ROOF FOR AUTOMOBILE OR OTHER CLOSED BODIES.
APPLICATION FILED DEC. 9, 1915.
1,237,902.
Patented Aug. 21, 1917
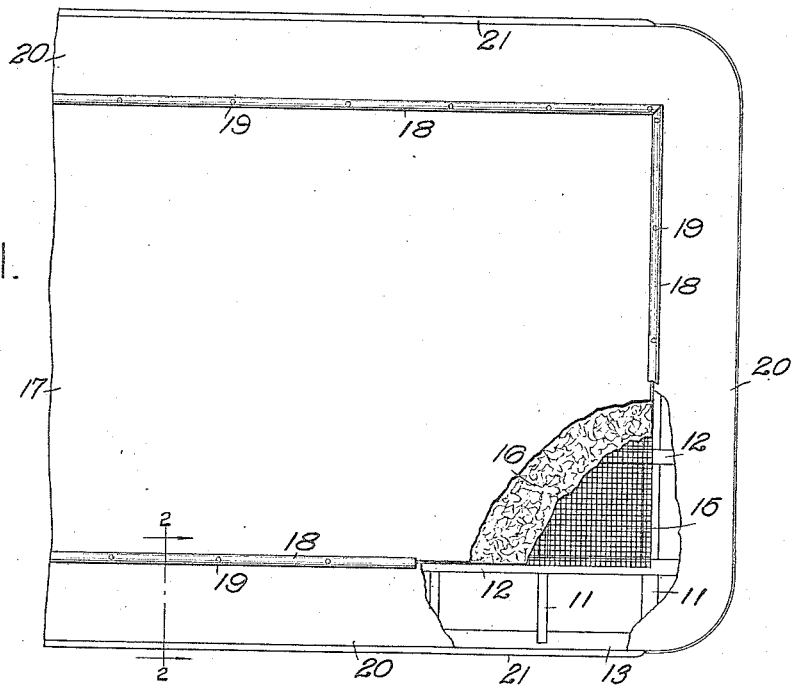
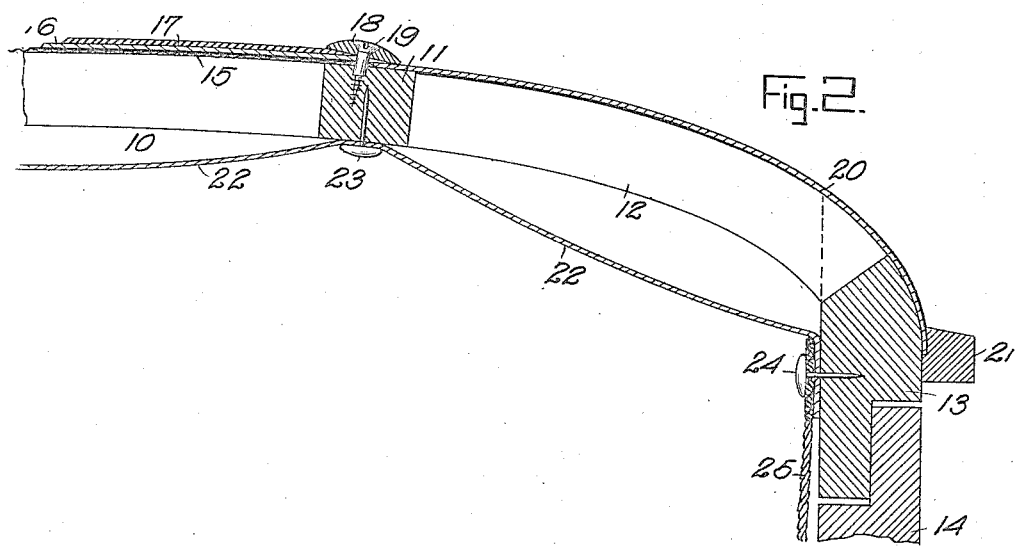
WITNESSES
INVENTOR
Warren M. Healey
BY
ATTORNEYS

UNITED STATES PATENT OFFICE.

WARREN M. HEALEY, OF NEW YORK, N. Y.

ROOF FOR AUTOMOBILE OR OTHER CLOSED BODIES.

1,237,902. Specification of Letters Patent. Patented Aug. 21, 1917.

Application filed December 9, 1915. Serial No. 65,899.

*To all whom it may concern:*

Be it known that I, WARREN MANSFIELD HEALEY, a citizen of the United States, and a resident of the city of New York, borough of Manhattan, in the county and State of New York, have invented a new and Improved Roof for Automobile or other Closed Vehicle Bodies, of which the following is a full, clear, and exact description.

The invention relates to limousines and other automobile or closed bodies, and the object of the invention is to provide a new and improved roof for closed automobile or other bodies arranged to reduce to a minimum the air vibrations inside of the body, thus relieving the occupant of the body of undesirable sound waves set up incident to the action of the chassis.

In order to produce the desired result, use is made of a skeleton roof frame over which is stretched wire cloth supporting a padding of felt or other suitable substance overlaid with enamel-faced leather or other suitable material.

A practical embodiment of the invention is represented in the accompanying drawings forming a part of this specification, in which similar characters of reference indicate corresponding parts in both views.

Figure 1 is a plan view of a portion of the roof of the closed body of an automobile, parts being shown broken out; and Fig. 2 is an enlarged transverse section of the same on the line 2—2 of Fig. 1.

In a limousine or other similar automobile having a closed body mounted on the chassis, vibrations are produced in the chassis incident to the running of the automobile and these vibrations are transmitted to the closed body and are especially noticeable in the roof, which thus acts as a sounding board. The vibrations set up in the roof produce vibrations in the air within the body at the roof and consequently undesirable annoying noises are produced. In order to break up the air vibrations mentioned I construct the roof in the manner presently to be described.

A skeleton frame 10 is formed of transverse and longitudinal members 11 and 12 of wood or other suitable material, and the terminals of the members 11 and 12 are arched to connect with supporting bars 13 attached to the upper edge of the body 14 in the usual manner. Over the horizontal flat portion of the skeleton frame 10 is stretched wire cloth 15 on which rests a padding 16 of felt or other substance overlaid by a waterproof material 17 such as enamel-faced or painted cloth. The edges of the several layers 15, 16 and 17 extend over the corresponding members 11 and 12 of the skeleton frame and are fastened to such members by moldings 18 fastened in position by screws 19 screwing in the members 11 and 12. The moldings 18 overlie the covering metal 20, enameled leather or other substance, extending from the flat portion over the arched portions of the roof frame 10, as indicated in Fig. 2, the lower edges of the covering 20 being fastened in place on the bars 13 by strips 21.

It will be noticed that by strengthening the roof in the manner described an exceedingly light, strong and durable roof is provided, it being understood that the wire cloth 15 is sufficiently firm to prevent sagging and the padding 16 of felt tends to reduce the air vibrations inside the body to a minimum thus relieving the occupant of the automobile body of the undesirable sound waves set up incident to the action of the chassis. The enamel leather covering 17 protects the felt padding 16 against moisture and at the same time the covering 17 gives a finished appearance to the roof.

The upper or under side of the skeleton frame 10 is covered by a suitable lining 22 of suitable material fastened to the members 11 and 12 of the frame by nails 23, the lining 22 also extending to the side bars 13 to which they are fastened by nails 24 which also serve to fasten the side lining 25 of the body in place.

Having thus described my invention, I claim as new and desire to secure by Letters Patent:

A roof for closed automobile bodies having a horizontal flat portion, comprising supporting bars, a skeleton frame formed of longitudinal and transverse bars having their terminals arched and secured to the supporting bars, a covering for the horizontal flat portion of the frame formed of wire cloth, padding on the wire cloth, and waterproof material over the padding, the several layers of the cover extending over the bars of the frame, a waterproof covering for the arched portion of the frame having its lower edge secured to the supporting bars and its upper edge extending upon the bars of the frame, and moldings secured to the bars of the frame over the adjacent edges of the said coverings.

In testimony whereof I have signed my name to this specification in the presence of two subscribing witnesses.

WARREN M. HEALEY

Witnesses:
FREDERICK D. HARING,
FREDERICK E. WIBEL.